United States Patent
Vogt et al.

(10) Patent No.: US 6,589,463 B1
(45) Date of Patent: Jul. 8, 2003

(54) HIGH TENSILE STRENGTH POLETHYLENE TEREPHTHALATE FILM AND PROCESS

(75) Inventors: Oliver Harold Vogt, Whitby (CA); Sharon Anne Rossi, Whitby (CA)

(73) Assignee: DuPont Canada Inc., Mississauga (*) Notice: Subject to any disclaimer, the term of this patent is extended or adjusted under 35 U.S.C. 154(b) by 0 days.

(21) Appl. No.: 09/980,970

(22) PCT Filed: Jun. 1, 2000

(86) PCT No.: PCT/CA00/00645
§ 371 (c)(1),
(2), (4) Date: Mar. 26, 2002

(87) PCT Pub. No.: WO00/73044
PCT Pub. Date: Dec. 7, 2000

Related U.S. Application Data

(60) Provisional application No. 60/136,962, filed on Jun. 1, 1999, and provisional application No. 60/178,444, filed on Jan. 27, 2000.

(51) Int. Cl.$^7$ ............................................. B29C 47/88
(52) U.S. Cl. .................. 264/146; 264/210.7; 264/211; 264/288.4; 264/294
(58) Field of Search .............................. 264/146, 210.7, 264/211, 212, 288.4, 294

(56) References Cited

U.S. PATENT DOCUMENTS

| | | |
|---|---|---|
| 2,556,295 A | 6/1951 | Pace, Jr. |
| 3,627,579 A | 12/1971 | Heffelfinger |
| 3,734,994 A | 5/1973 | Blecha |
| 4,286,011 A | 8/1981 | Wong |
| 4,428,724 A | 1/1984 | Levy |
| 4,477,407 A | 10/1984 | Hetherington et al. |
| 4,844,962 A | 7/1989 | May et al. |
| 5,203,935 A | 4/1993 | May et al. |
| 5,443,780 A * | 8/1995 | Matsumoto et al. ..... 264/290.2 |
| 5,464,151 A | 11/1995 | Parker et al. |
| 5,618,609 A * | 4/1997 | Chujo et al. ............... 428/141 |
| 5,730,354 A | 3/1998 | O'Connor |
| 5,806,281 A | 9/1998 | Krul et al. |
| 5,840,235 A * | 11/1998 | Yagi et al. ............... 264/288.8 |

FOREIGN PATENT DOCUMENTS

| | | |
|---|---|---|
| EP | 0 030 648 | 6/1981 |
| EP | 0 466 921 | 1/1992 |
| EP | 0 711 649 | 5/1996 |
| GB | 1136133 | 12/1967 |
| JP | 61051323 | 3/1986 |
| JP | 29398/1971 | 8/1993 |

* cited by examiner

Primary Examiner—Mark Eashoo

(57) ABSTRACT

A process for producing mono-axially oriented polyethylene terephthalate film having increased mechanical strength in the machine direction which comprises the steps of drying substantially homopolymer or copolymer polyethvlene terephthalate resin having an intrinsic viscosity in the range of about 0.65 to about 0.85 dg/cc and then blending the dried resin with from about 0.5 to about 4.0% by weight of anti-block additive; extruding the resin blend to re-melt the resin and make it homogeneous: casting a film web with the resin blend; orienting the film immediately after casting it to produce a film of uniform thickness, by drawing the film at a ratio of from about 3.5 to about 4.5 times while constraing the web along its edges to prevent shrinkage in the TD direction; allowing the film web to relax to a lower tension, cooling the film web, further relaxing the film web and then quenching it to room temperature; subjecting the film web to a second orientation step andunder similar conditions to the first step except that the film is drawn at a draw ratio of about 1.025 to about 1.150, and at a draw temperature that is slightly higher than used in the first draw, while cosraining the web along its edges to prevent shrinkage in the TD direction; allowing the film to relax and annealing the film to a temperature in the range of from about 100 to about 180 ° C., and then relaxing it further and cooling it to a temperature near room temperature; and trimming and winding the film web into rolls. The film has particular application in the production of tape for all types of purposes, most particularly teartape.

7 Claims, 3 Drawing Sheets

Series 1  MD Not Annealed
Series 2  TD Not Annealed
Series 3  MD Annealed
Series 4  TD Annealed

HIGH TENSILE STRENGTH POLETHYLENE TEREPHTHALATE FILM AND PROCESS

This application claims benefit of application Ser. Nos. 60/136,962 and 60/178,444 filed Jun. 1, 1999 and Jan. 27, 2000 respectively.

FIELD OF THE INVENTION

This invention relates to a mono-axially oriented polyethylene terephthalate (PET) film with extraordinary mechanical strength in the machine direction (MD). A novel process is described that produces film from which tape for various applications can be manufactured. The tape is thinner but stronger than conventional tape.

BACKGROUND OF THE INVENTION

For some polyester films, high strength is, in general, required in the longitudinal direction, namely the winding direction of the film products, due to application demands. However, resistance against impact and other tearing stresses are also required. Accordingly, in many applications, polyester films or tapes having extremely high tensile strengths in the longitudinal direction with a high tear strength in the transverse direction, sufficient resistance to the stresses of folding, and tearing and impact in all directions, i.e., no tendency towards fibrillation are in demand in the market. Moreover, good dimensional stability or low thermal shrinkage, in addition to the above-mentioned characteristics, is also required.

Films which fulfill the above-mentioned requirements are usually biaxially stretched films of polyethylene terephthalate. In order to stretch film biaxially, however, a transverse (TD) stretching apparatus called a "tenter" is required. This apparatus has the drawback not only of high cost, but also requires lower production speed. Moreover, other problems, such as breaking at the time of stretching, or the like are apt to occur. In U.S. Pat. No. 2,556,295 and U.S. Pat. No. 3,627,579, processes for producing films having the above-mentioned properties by uniaxially stretching polyethylene terephthalate are described. According to these processes, tapes or films having less tendency to fibrillation have been obtained by performing the uniaxial stretching in two steps in the first patent is required, while, in the second patent, the use of a polymer with a high degree of polymerization is required. However, these processes have drawbacks also. The first puts more weight on fibers as seen from the examples thereof, but the strength in the transvere direction, required for films, is insufficient and heat shrinkage is also poor. The second process cannot meet both the properties of high strength and antifibrillation completely because these two properties have been shown to be mutually opposite in direction. Further, the strength is insufficient in the direction perpendicular to the stretching direction.

In contrast, British Patent No. 1,136,133 and Japanese Patent Publication No. 29398/1971, describe attempts to improve the drawbacks of conventional uniaxially stretched polyethylene terephthalate films by using polyethylene-1,2-diphenoxyethane-4,4'-dicarboxylate instead of polyethylene terephthalate as a raw material polymer, and uniaxially stretching the layer of the polymer. Of these two patents, the former prevents fibrillation by carrying out a heat treatment to increase the degree of crystallization before MD stretching and the latter prevents fibrillation by dividing MD stretching into two steps and inserting a heat treatment step between these two steps.

However, the processes of these two patents have drawbacks in that, if the degree of preliminary crystallization and the temperature of the intermediate heat treatment are lowered, sufficient reduction of the fibrillation effect cannot be attained. If these parameters are elevated, uniform stretchability becomes worse. This results in non-uniform stretching and strength in the transverse direction (T.D.) is lowered, which occurs because of the preliminary crystallization treatment.

In U.S. Pat. No. 4,286,011 to Wong, there is described the use of a polyester film that includes a mixture of PET and sufficient polytetramethylene terephthalate to increase film tear strength. The film may be unoriented, uniaxially oriented and biaxially oriented in the TD direction only. A tenter frame is used.

In U.S. Pat. No. 3,734,994 to D. L. Blecha, there is described a two stage draw process for producing polyethylene terephthalate film, but there is no heat set step or edge restraint.

SUMMARY OF THE INVENTION

The present invention provides a process for producing mono-axially oriented polyethylene terephthalate film having increased mechanical strength in the machine direction which comprises the steps of drying substantially homopolymer or copolymer polyethylene terephthalate resin having an intrinsic viscosity in the range of about 0.65 to about 0.85 dg/cc and then blending the dried resin with from about 0.5 to about 4.0%, preferably from about 1 to about 3.0% by weight of anti-block additive;

extruding the resin blend to re-melt the resin and make it homogeneous;

casting a film web with the resin blend;

orienting the film immediately after casting it to produce a film of uniform thickness, by drawing the film at a ratio of from about 3.5 to about 4.5 times, preferably about 4.0 times, while constraining the web along its edges to prevent shrinkage in the TD direction;

allowing the film web to relax to a lower tension, cooling the film web, further relaxing the film web and then quenching it to room temperature;

subjecting the film web to a second orientation step under similar conditions to the first step except that the film is drawn at a draw ratio of about 1.025 to about 1.150, and at a draw temperature that is slightly higher than used in the first draw, e.g. about 90 to about 120° C., preferably about 100° C., preferably at a draw ratio of about 1.05 times while constraining the web along its edges to prevent shrinkage in the TD direction;

allowing the film to relax and annealing the film to a temperature in the range of from about 100 to about 180° C., preferably about 150° C. and then relaxing it further and cooling it to a temperature near room temperature; and trimming and winding the film web into rolls.

The process of the present invention produces a product with superior properties. In particular the film does not fibrillate which makes it very useful in the production of tape for a variety of commercial purposes, such as tear tape for packaging. Examples of tear tape applications can be found in U.S. Pat. Nos. 5,806,281 of Krul et al.; 5,730,354 of O'Connor; 5,464,151 of Parker et al.; 4,844,962 of May et al.; and 5,203,935 of May et al. The disclosures of these patents are incorporated herein by reference.

DETAILED DESCRIPTION OF THE INVENTION

The film is first cast at an ambient temperature that is as low as is feasible and which is dependant on the environmental conditions in which the process is operated. It has been found that the process requires orienting the film immediately after casting, to as high a "Draw Ratio" as is practical, usually in the range of about 3.5 to about 4.5 times and preferably 4.0 times, and at a temperature as low as possible, but usually in the range of from about 70 to about 85° C., preferably about 70° C. without undue force being applied to draw the film web. The film web is held at almost constant width by constraining devices known in the art, examples of which are described in U.S. Pat. No. 4,477,407 issued Oct. 16, 1984 to Hetherington et. al., the disclosures of which are incorporated herein by reference. This patent describes an apparatus and process using a narrow gap draw for orienting a polymeric film. Another example of constraining means known in the art is found in Levy U.S. Pat. No. 4,428,724, the disclosures of which are incorporated herein by reference, which patent describes a microgrooved prcessing roll that reduces the air layer between the polymeric film being processed and the roll. This arrangement aids heat transfer, provides transverse shrinkage restraint and increases processing speed.

After this MD orientation step, the film is trimmed and wound for further processing. At this point in the process, the film has a medium strength in proportion to the draw ratio used. The film is now subjected to a second smaller draw ratio MD orientation process, again holding the film web width constant. This second orientation is conducted at a temperature within a range that will allow the draw force to be kept reasonably low. The film is then relaxed, heat set, relaxed further and cooled. The film is then trimmed and wound in a conventional manner.

The substantially homopolymer or copolymer polyethylene terephthalate resin may be selected from commercially available resins. The substantially or essentially pure homopolymer may contain not more than about 3% by weight of conventionally known impurities, additives or copolymerizing agents. The presence of such material is evident from a drop in the crystalline melting point of the resin which when such impurities are present may range from about 240° C. to about 245° C., and perhaps up to about 249° C. The crystalline melting point for pure homopolymer may range from about 249° C. to about 255° C. When a copolymer resin is used, its selection is based on whether it can be processed to produce a film having the desired properties. Commercial examples of such materials include KODAK® 9921 and KODAK® 9922W.

Surprisingly, the strength of the resulting film is suddenly and dramatically higher after the second orientation than after the first orientation. The film strength is about 20,000 psi stronger in the MD than prior to the second orientation step (in the order of 40% or 1.4 times as high). The film properties obtained are unexpected because the MD draw ratio of the second step is very small and ordinarily one does not expect to see such a large increase in tensile strength. The other unusual result is that the MD tear strength remains high enough for the film to be generally useful as film and does not shrink or fibrillate in post processing applications or use.

BRIEF DESCRIPTION OF THE DRAWINGS

In the accompanying drawing which is used to illustrate the process of the present invention.

DETAILED DESCRIPTION OF THE DRAWINGS

Figure 1:
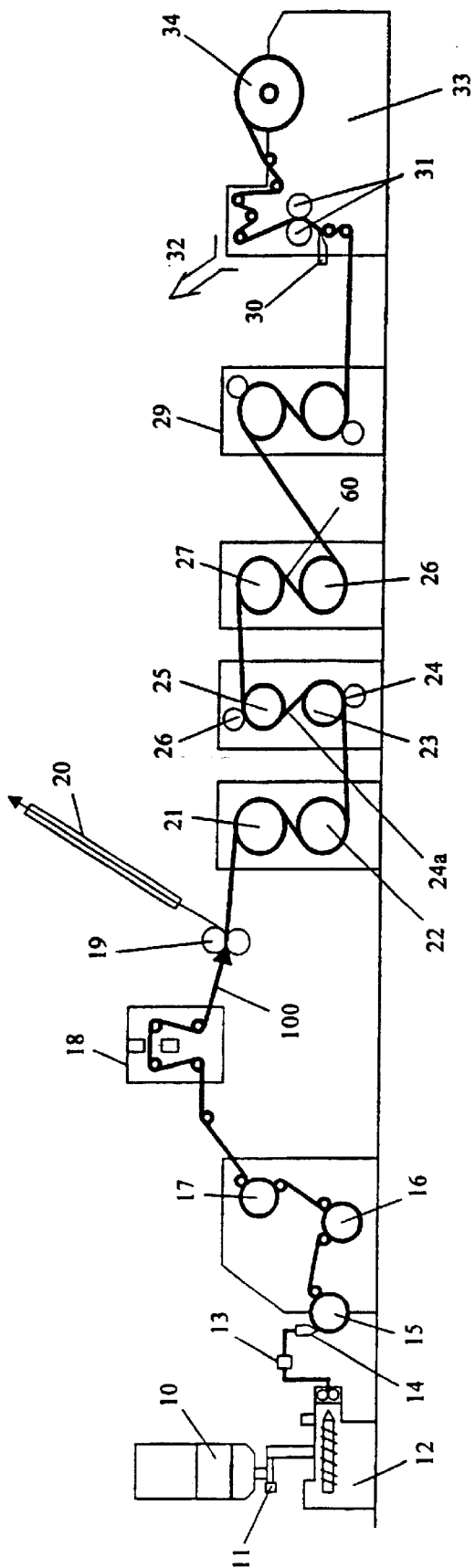
FIG. 1 is a schematic presentation of an apparatus for the casting and the first draw stage of the present invention.

Referring now to FIG. 1, there is shown an apparatus set up for film production in first stage orientation.

The apparatus is shown generally at 10 and comprises a hopper dryer and feeder 11 for a resin/additive mixture prepared in accordance with the process of the present invention. The resin additive mixture is added to extruder and melt pump 12 which re-melts and mixes the resin and the additives together. A filter 13 located between extruder 12 and a flat film die 14 removes contaminates and debris from the resin and additives mixture. The flat film die 14 spreads the polymer uniformly and thinly and ensures that there is produced a uniform thin film layer of molten polymer for casting roll 15 which freezes the film 100. First and second quench rolls 16, 17 follow casting roll 15 and these cool the film 100 as it comes off the casting roll 15. A Beta Gauge 18 measures the thickness and uniformity of the film 100. Nip rolls 19 and trim haul off device 20 which is a pneumatic suction device edge trim the film 100 after it has been measured for thickness and uniformity. The film 100 is then fed onto first and second pre-heat rolls 21,22 and then onto the draw rolls 23, 25 which comprise low speed and high speed draw rolls, respectively. Nip rolls 24 and 26, with 24 being the low speed nip roll and 26 being the high speed draw roll are located adjacent each of the low speed and high speed draw rolls, respectively. The space between the low speed draw roll 23 and high speed is draw roll 25 is narrow gap draw 24a. This gap is determined to ensure that the draw or orientation is conducted in accordance with the requirements of the process of the invention. The film 100 after this first orientation or drawing is fed over first and second quench rolls 27,28 which cool the film 100 before it is subjected optionally to a print treatment process 29, usually corona discharge. The film 100 after being subjected to print treater 29 is fed to slitter 30 which slits the film 100. A pair of pull rolls 31 remove the film 100 from the slitter and trim haul off device 32 trims the edges as required. The film 100 is then wound on winder 33 into a roll 34.

Figure 2:
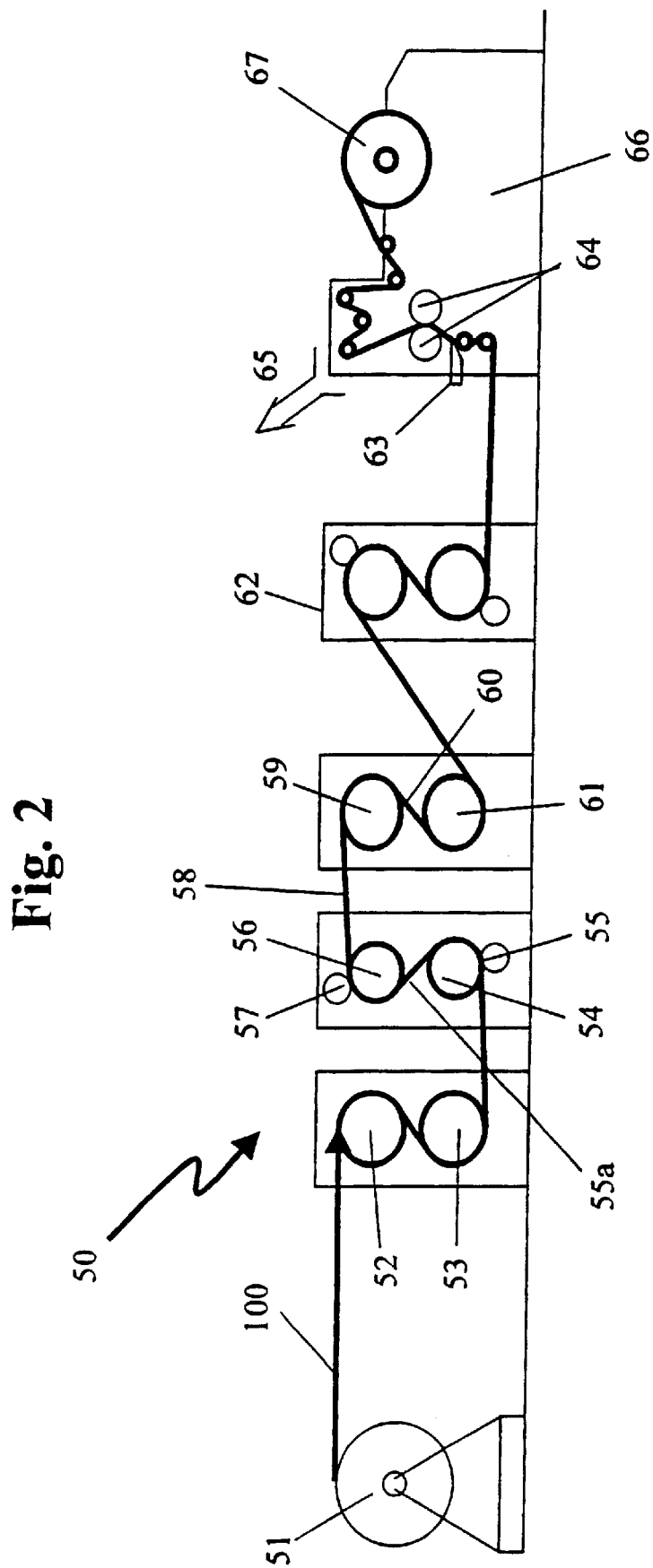
FIG. 2 is a schematic representation of an apparatus for the second orientation step of the process of the present invention.

Turning now to FIG. 2, there is shown therein a schematic representation of an; apparatus for conducting the second orientation step of the process of the present invention. The apparatus is designated generally by numeral 50. The apparatus comprises an unwind stand 51 upon which the roll of film, which has previously been subjected to a single orientation process is placed and then unwound. The film 100 is led from the unwind stand 51 to first and second pre-heat rolls 52,53. The film 100 is then fed into the low speed draw roll 54 which has associated with it a nip roll 55. The film 100 runs from the low speed draw roll 54 to the high speed draw roll 56 and its associated nip roll 57. A narrow gap 55a exists between the two rolls and the surfaces of each of these rolls are micro-grooved to provide edge support for the film 100. The speeds of the rolls are determined in accordance with the desired draw ratio as set out in the earlier description of the process of the present invention. A relaxation zone 58 is provided between the draw rolls 56 and annealing roll 59. Another relaxation zone 60 is provided prior to quench roll 61. After quenching, the film 100 is led to print treater 62, for corona treatment. Again, this treatment is optional and it is not necessary when the treatment is to be provided later on or the treatment is not desired. After the film 100 is passed through the print treater 62 it is led to slitter 63 and then via a pair of pull rolls 64 to trim haul off device 65 which is, of course, a pneumatic suction device for removing trim that is taken from the sides of the film 100. After this, the film 100 is fed onto winder 66 to produce a roll of film 67.

Operation of Process Pet Resin

The resin used in this process was ordinary commercial grade polyethylene terephthalate (PET) homopolymer in the range of 0.65 to 0.85 dg/cc intrinsic viscosity. The resin was first dried in a conventional heated desiccant dryer in accordance with known procedures and to a moisture level suggested by the resin manufacturer. The resin was blended with a few percent anti-block additive, examples of which are tricalcium phosphate, calcium carbonate or silica. Colouring agents or pigments which are known to be compatible with polyester, for example, Sicoversal® red (available from BASF), black or white may be added here also, if desired.

Extrusion Stage

The polymer was extruded in an ordinary commercial twin screw extruder (Werner & Pfleiderer) to melt the resin and make the melt homogeneous. Care was taken to insure the melt temperature stayed below the normal manufacturer's recommended temperatures for PET.

The polymer melt was pumped through a filter media with as fine a mesh (for example, 70µ filter mesh) as was practical to permit further processing. The polymer was then extruded through a conventional "coat hanger" style cast film die. The polymer was cast on a conventional cold quench roll (e.g., water-cooled spiral channels) at temperatures of from about 15 to about 25° C.

The film was gauge profiled or measured across from one edge to the other by a scanning micrometer using a Beta Gauge (commercial product) and the die is adjusted to obtain a uniform cross web profile. This ensures that the film produced has a uniform thickness across the whole sheet.

First Orientation Stage

Using a standard orienter in line with the casting machine, the film was processed through the orienter within a few minutes of being cast. The orientation steps may comprise:

a) Gently preheat the web to a temperature in the range of from about 75 to about 90° C., preferably 85° C., which temperature is selected to be low enough to prevent crystalitity and to prevent the film sticking to the roll surfaces and yet high enough to keep the draw force at a reasonably low value so that the film orientation produces film or uniform thickness film, preferably in the range of 12–25µ, but this thickness does depend on the film application.

b) The film is drawn at a ratio of up to 4.5 times its original length while at the same time taking as much care to constrain the web from shrinking in the TD direction. The maximum draw ratio for the present process has been found to be less than that reported in the general literature because it is not common practice to restrain the film from shrinking in the TD direction when reporting the maximum draw ratio. It has been found through experiments that the maximum draw ratio for the film while restraining its edges from shrinkage is always less than the reported maximum. The reported maximum draw ratio (DR) is often determined from fiber spinning.

c) The film is relaxed to a lower tension and cooled, and further relaxed and then quenched to room temperature. The film edge is trimmed and the film wound in a conventional manner.

Film Properties After First Orientation Stage

The film tensile properties are approximately 39,000 psi in the MD and 12,000 psi in the TD.

The MD strength is roughly linearly proportional to the draw ratio. For example, a film with a draw ratio of 2.25 would have a tensile strength of approximately 24,000 psi.

Second Orientation Stage

The process conditions for the second orientation are similar to the first orientation stage.

a) The film is preheated to a temperature that is low enough to prevent sticking to the roll but high enough to permit drawing at reasonably low draw forces, usually in the range of from about 90 to about 120° C., preferably 100° C. The choice is also made with the objective of avoiding crystallization of the polymer.

b) The film is drawn again at a small draw ratio of for example, about 1.05 while constraining the edges.

c) The film is then allowed to relax its tension by reducing the draw force so that the draw ratio of this step is slightly less than 1.00.

d) The film is heat set at a high temperature, approximately 150° C. or higher to control the shrinkage and crystallize the polymer structure.

e) The film is allowed to relax further at a draw ratio slightly less than 1.0 for this step and then quenched to room temperature.

f) The film is trimmed and wound into rolls in a conventional manner.

Final Film Properties

The tensile properties of the final film were approximately:

69,000 psi in the MD; % Elongation to break 25%;

10,000 psi in the TD; % Elongation to break 25%.

These properties are approximately 40% higher than the same properties are before the second stage orientation process. A modest 5% or 10% increase was anticipated and these increases were very surprising.

Figure 3:
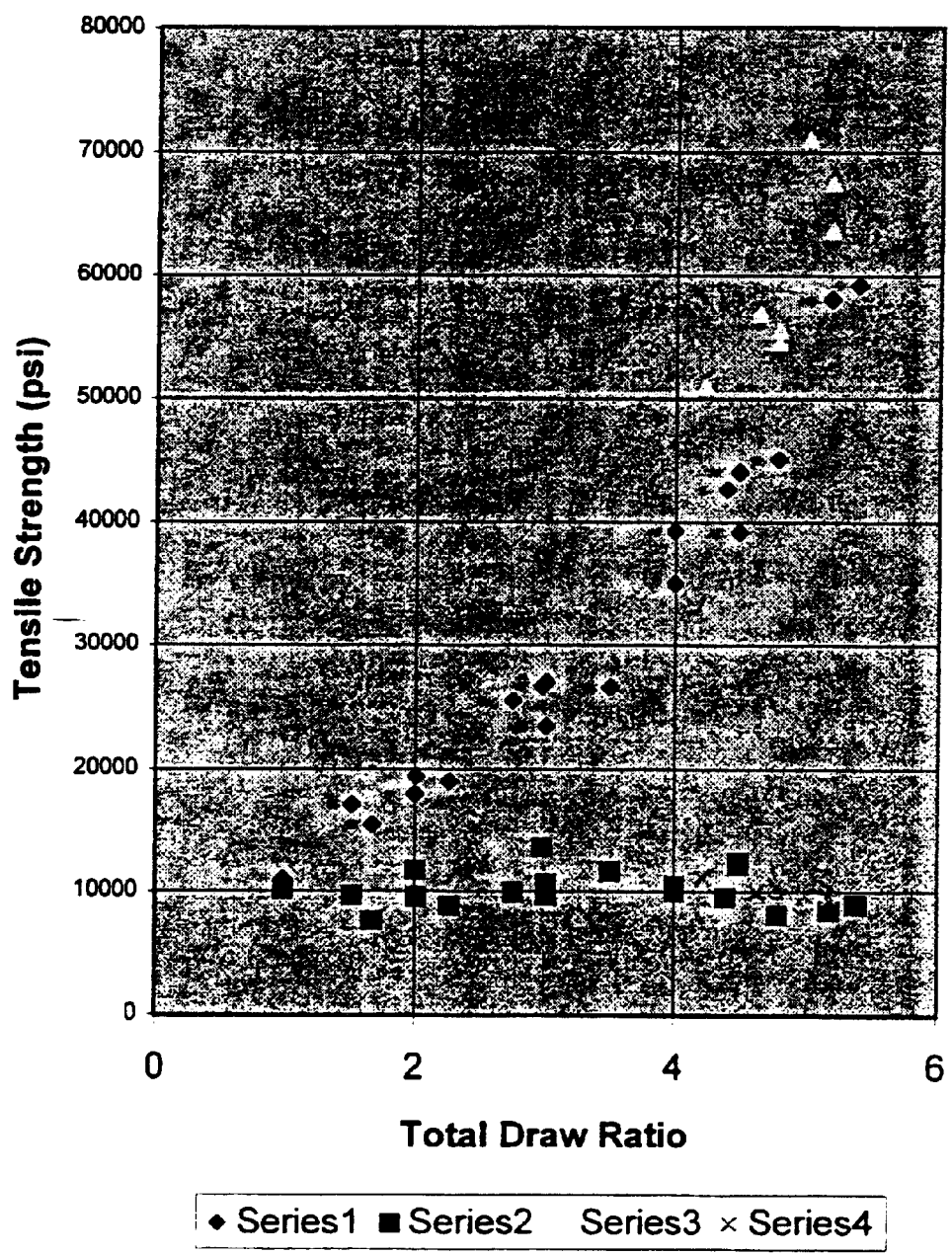
FIG. 3 is a graphical representation of a plot of the tensile strength of films produced by the present process as compared with films produced with a single orientation step.

Following these process steps a number of films were produced. The properties of these films are found in the following Table I. The results are graphically represented in FIG. 3. Different runs were made that produced films that were only oriented a single time at a draw ratio prescribed for the orientation step of the process. Tensile strength first for all of these films were determined.

A number of films produced using the two step orientation process of the present invention and their tensile strengths were measured using a Instron tensile tester employing ASTM method D-882* with a 50 mm jaw space and a 25 mm/min crosshead speed with an ASTM D6308 specimen. The graph clearly demonstrates the TD strength remains the same for both types of films (single and double stage processes), but the MD shows a remarkable increase in the tensile strength for the total draw ratio.

TABLE I

Elongation and Dimensional Stability Data Homopolymer Polyester Film

| Total Draw Ratio | Anneal Temp | Tensile in PSI | | % ELONG at BRK | | 105° C. Shrinkage | | First Draw Ratio |
|---|---|---|---|---|---|---|---|---|
| | | MD | TD | MD | TD | MD | TD | |
| 4.00 | 100 | 39300 | 10043 | 33 | 400 | 7.9 | 7.1 | 2.0 |
| 4.40 | 100 | 42695 | 9530 | 26 | 410 | 6.9 | 6.9 | 2.0 |
| 4.80 | 100 | 45066 | 8100 | 25 | 404 | 7.9 | 7.9 | 2.0 |
| 5.20 | 100 | 58068 | 8437 | 25 | 400 | 8.8 | 8.9 | 2.0 |
| 5.40 | 100 | 59180 | 8930 | 25 | 400 | 9.8 | 8.7 | 2.0 |
| 5.20 | 150 | 63700 | 9565 | 28 | 25 | 1.6 | 0.4 | 2.0 |

TABLE I-continued

Elongation and Dimensional Stability Data
Homopolymer Polyester Film

| Total Draw Ratio | Anneal Temp | Tensile in PSI MD | Tensile in PSI TD | % ELONG at BRK MD | % ELONG at BRK TD | 105° C. Shrinkage MD | 105° C. Shrinkage TD | First Draw Ratio |
|---|---|---|---|---|---|---|---|---|
| 4.65 | 150 | 57019 | 9969 | 25 | 25 | 0.6 | 0.0 | 3.0 |
| 4.23 | 150 | 51039 | 11115 | 25 | 25 | 1.2 | 0.4 | 3.0 |
| 4.80 | 150 | 55631 | 9350 | 25 | 25 | 1.6 | 0.4 | 3.0 |
| 4.50 | 100 | 39200 | 12138 | 28 | 508 | 0.8 | 9.5 | 4.50 |
| 5.20 | 150 | 67483 | 10367 | 28 | 355 | 1.4 | 0.4 | 4.50 |
| 3.00 | 100 | 27018 | 9719 | 50 | 400 | 27.2 | 20.5 | 3.0 |
| 4.80 | 150 | 54603 | 10373 | 25 | 25 | 0.6 | 0.0 | 3.0 |
| 1.53 | 80 | 17110 | 9700 | 276 | 415 | 37.0 | 4.0 | 1.53 |
| 1.68 | 80 | 15450 | 7610 | 239 | 419 | 44.0 | 1.0 | 1.68 |
| 2.01 | 80 | 19370 | 9570 | 182 | 438 | 51.0 | 4.0 | 2.01 |
| 2.26 | 80 | 18940 | 8850 | 166 | 363 | 56.0 | 12.0 | 2.26 |
| 2.74 | 80 | 15530 | 9950 | 147 | 423 | 55.0 | 8.0 | 2.74 |
| 2.97 | 80 | 26700 | 13600 | 102 | 424 | 54.0 | 2.0 | 2.97 |
| 1.00 | 100 | 10982 | 10206 | 487 | 225 | 3.2 | 2.4 | 1.00 |
| 2.00 | 100 | 17906 | 11702 | 179 | 477 | 52.0 | 7.8 | 2.00 |
| 3.00 | 100 | 23420 | 10573 | 72 | 455 | 28.0 | 22.5 | 3.00 |
| 3.50 | 100 | 26663 | 11617 | 42 | 518 | 12.6 | 20.1 | 3.50 |
| 4.00 | 100 | 34989 | 10482 | 36 | 475 | 9.5 | 17.3 | 4.00 |
| 4.50 | 100 | 44079 | 12365 | 28 | 520 | 8.7 | 7.9 | 4.50 |
| 5.02 | 150 | 71057 | 9660 | 25 | 390 | 3.5 | 0.4 | 4.50 |

Applications for Film

The film obtained by the process of the invention possesses unique physical strength properties that are valued in end uses where physical strength in the MD direction is desired. Examples of such applications include:

- tear tape applications for zippering open a lower strength film that is used as an overwrap, for example a compact disc package;
- carton tape used to hold closed cardboard shipping cartons holding heavy loads;
- industrial tape to hold together heavy loads (for example, steel bars) for ease of transport;
- industrial overwrap applications where strength and temperature resistance are valued; and
- pull tabs on containers, for example, safety flares and easy open cardboard boxes.

The prior art contains information on how to produce the aforementioned products. Reference is made to some tear tape patents in the Background of the Invention section of this description.

While the invention has been described with particular reference to certain embodiments thereof, it will be understood that changes and modifications may be made by those of ordinary skill in the art within the scope and spirit of the following claims.

In the claims, the word "comprising" means "including the following elements (in the body), but not excluding others"; the phrase "consisting of" means "excluding more than traces of other than the recited ingredients"; and the phrase "consisting essentially of" means "excluding unspecified ingredients which materially affect the basic characteristics of the composition".

What is claimed is:

1. A process for producing mono-axially oriented polyethylene terephthalate film having increased mechanical strength in the machine direction which comprises the steps of drying substantially homopolymer or copolymer polyethylene terephthalate resin having an intrinsic viscosity in the range of about 0.65 to about 0.85 dg/cc and then blending the dried resin with from about 0.5 to about 4.0% by weight of anti-block additive;

extruding the resin blend to re-melt the resin and make it homogeneous;

casting a film web with the resin blend;

orienting the film immediately after casting it to produce a film of uniform thickness, by drawing the film at a ratio of from about 3.5 to about 4.5 times while constraining the web along its edges to prevent shrinkage in the TD direction;

allowing the film web to relax to a lower tension, cooling the film web, further relaxing the film web and then quenching it to room temperature;

subjecting the film web to a second orientation step under similar conditions to the first step except that the film is drawn at a draw ratio of about 1.025 to about 1.150, and at a draw temperature that is slightly higher than used in the first draw, while constraining the web along its edges to prevent shrinkage in the TD direction;

allowing the film to relax and annealing the film to a temperature in the range of from about 100 to about 180° C., and then relaxing it further and cooling it to a temperature near room temperature; and trimming and winding the film web into rolls.

2. The process as claimed in claim 1 wherein from about 1 to about 3.0% by weight of anti-block additive is added to the resin.

3. The process as claimed in claim 1 wherein the draw ratio is about 4.0 times for the first orientation step.

4. The process as claimed in claim 1 wherein the draw temperature for the second orientation step is from about 90 to about 120° C.

5. The process as claimed in claim 4 wherein the temperature is about 100° C.

6. The process as claimed in claim 1 wherein the draw ratio for the second orientation step is 1.05.

7. The process as claimed in claim 1 wherein the annealing takes place at a temperature of about 150° C.

\* \* \* \* \*

UNITED STATES PATENT AND TRADEMARK OFFICE
CERTIFICATE OF CORRECTION

PATENT NO. : 6,589,463 B1 Page 1 of 1
DATED : July 8, 2003
INVENTOR(S) : Vogt Oliver Harold and Rossi Sharon Anne It is certified that error appears in the above-identified patent and that said Letters Patent is hereby corrected as shown below:

<u>Title page,</u>
Item [54], Title, delete "POLETHYLENE", add -- POLYETHYLENE --

Signed and Sealed this

Twenty-third Day of September, 2003

JAMES E. ROGAN
*Director of the United States Patent and Trademark Office*